Jan. 1, 1957 F. LIPPE 2,776,129
PRODUCTION OF SINTERED BUILDING MATERIAL
Filed Oct. 16, 1952
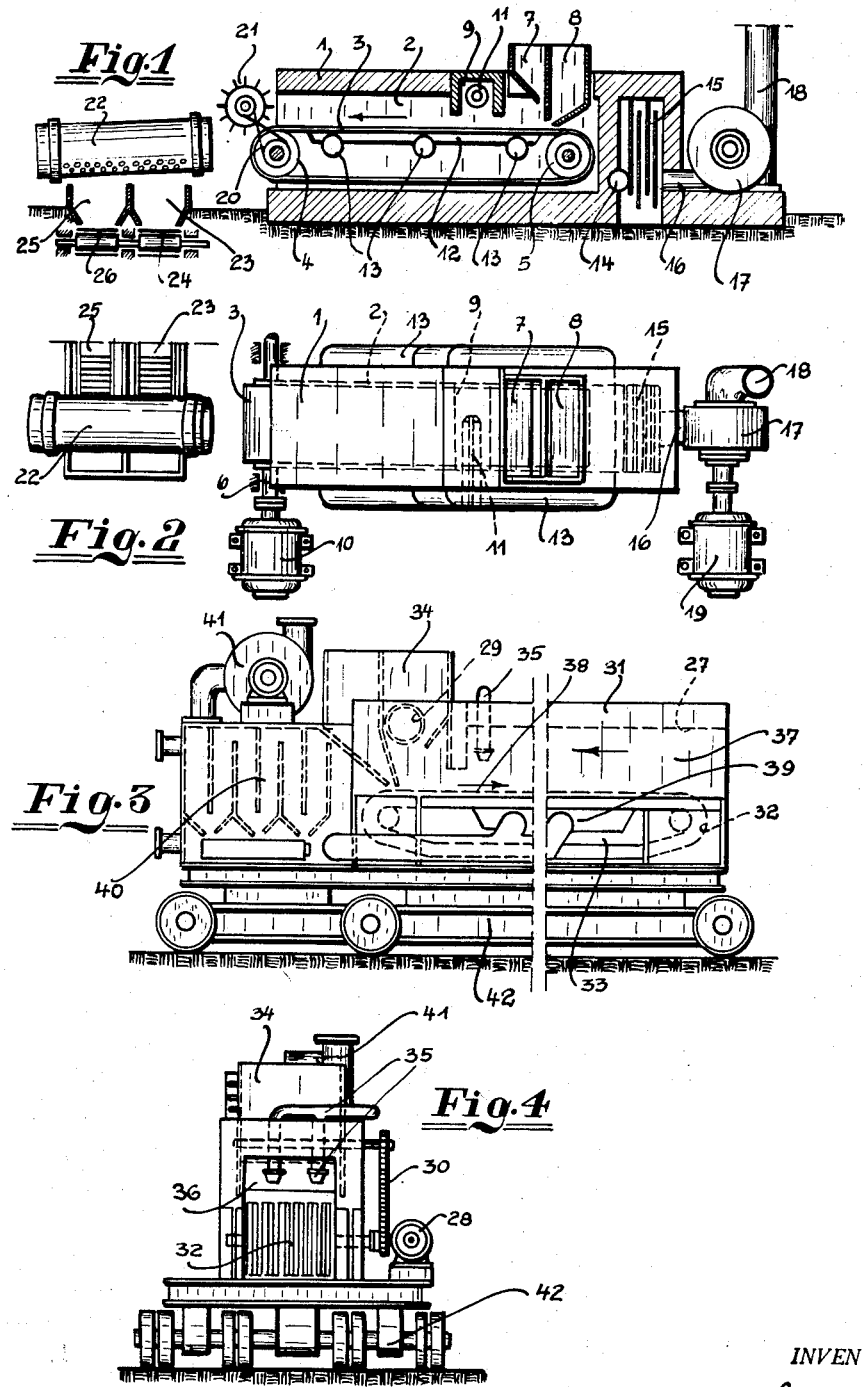
INVENTOR.
BY Fritz Lippe

United States Patent Office 2,776,129
Patented Jan. 1, 1957

2,776,129

PRODUCTION OF SINTERED BUILDING MATERIAL

Fritz Lippe, Naumburg, Germany, assignor of part interest to Robert Koster, Frankfurt am Main, Germany Application October 16, 1952, Serial No. 315,073

Claims priority, application Germany October 23, 1951

2 Claims. (Cl. 263—8)

This invention relates to the production of sintered building materials, including cement and porous light-weight building blocks having properties similar to those of pumice stone.

It is an object of this invention to provide apparatus for the continuous conversion of a mix of mineral raw materials and low-grade fuel into such sintered building materials.

Hitherto, in order to produce such granulated or other materials, mixes have been used which contain high-grade fuel and the heat treatment of such mix, when it is intended to produce cement, has been carried out with the aid of rotary cylinder furnaces, in which the mix is subjected, mostly after calcination, to heat treatment.

In these old apparatuses, the raw material is deposited on a grate movable in longitudinal direction and is ignited by means of ignition devices. In apparatuses of this kind mixtures were treated which contained high-grade fuel and in this case the ignition of the mix offered no problem and therefore no means had to be provided in the old apparatus for producing near the ignition point the highest possible temperature.

In the apparatus according to this invention mixes containing low-grade fuels shall be treated and therefore means must be provided which enable the apparatus to produce a high temperature at the point of ignition.

It is another object of this invention to render this apparatus as a whole or in parts portable in such way that it can be worked at those places where the building material to be produced is required or where the raw materials can be found. Hitherto no portable apparatuses provided with a movable grate have been known.

In the apparatus according to this invention the movable grate is mounted in a tunnel kiln open at the discharge end and consisting of, or lined with, refractory material. In this kiln the grate moves the entire charge towards the discharge end. The air of combustion enters the kiln near the discharge end of the kiln, being sucked across the grate in counter-current to the direction of travel of the charge, and the roof and side walls of the kiln extend close to and parallel to the grate. A blower arranged below the discharge end of the grate drives the air gradually through the charge and carries along the combustion gases. The last air exhaust opening should be provided near the place where the charge is ignited and the highly heated air will cause also the low-grade fuel to be burned altogether.

The arrangement here described serves for creating in the neighborhood of the ignition device so high a temperature that all the bituminous and sulfurous constituents of the low-grade fuel are burned altogether, in order to prevent any distillation products from being carried into the suction conduits and clogging these and the blower.

This arrangement avoids the danger of gaseous bituminous matter being generated at a low temperature of 200–300° C. in the lower part of the mix which is ignited on its surface, and these gases would then be precipitated in the cold conduits and might lead to fire and explosion.

This is why the generation of an air temperature above 300° C. should be created near the ignition point across the entire charge.

In the apparatus according to this invention a high air temperature near the ignition point is obtained by a satisfactory insulation of the kiln and by a travel of the air in close contact with the burning mix. The roof and side walls of the tunnel kiln being arranged in the close vicinity of the surface of the charge, the air of combustion will therefore be highly heated near the discharge end of the kiln, where it first comes into contact with the heated charge. The instantaneous cooling of the cement clinkers, when producing cement, is guaranteed by the aspiration of the entire air of combustion near the discharge end of the kiln.

The grate should consist of a material resistant to high temperatures and, if necessary, may be cooled by water.

The high temperature prevailing in the tunnel kiln which is guaranteed by the particular way above described, of leading the air of combustion through the tunnel, renders it possible to operate in a comparatively short kiln for instance 6–10 meters long, and still obtain with low-grade fuel the high temperatures, for instance of 1,400° C., required in the sintering process, before the charge reaches the discharge end of the kiln.

Owing to this shortening of the kiln, it is possible to render the kiln portable because its entire weight remains below the point where the road surface would be damaged. The portability of the kiln involves great advantage insofar as it is particularly favorable for the use of low-grade fuel. Since all other parts of the apparatus can easily be rendered portable, the entire installation can be put to use in roadless countries in which cement or other sintered building materials are required. The kiln may be supported on any low-bed undercarriage, either in the form of a trailer or provided with a motor. It is also possible to provide a self-contained portable unit consisting of the tunnel kiln and movable grate. Whenever this installation is required to stay at one place for a long period of time, the undercarriage may be replaced by a stationary concrete bed.

In its portable form the kiln is preferably formed in the manner of a rotary cylinder kiln.

This apparatus is adapted for operation in the production of cement and similar binders or of porous light-weight building material similar to pumice stone and the temperatures required for this purpose can be reached with low-grade fuels admixed to the raw material to be sintered.

The low-grade fuel may consist of ashes, flue dust, low-grade brown coal, peat, residues of distillation processes, oil slate, residual carbon, or petroleum and the like.

When producing porous light-weight building material, more of this fuel may be contained in the raw material than if cement is produced. If the heat to be produced by the fuel should not be sufficient to reach the sintering temperature of 1,400° C. or higher, an additional oil or gas heating system may be added. Any additional heating gas can be produced in a gas producer or in the annular kiln of a brick works if such is in the vicinity. The additional gas can enter the discharge end of the tunnel kiln by suitable connections.

If it is intended to produce a granulated material from clay, loam slate or the like, the sintered final product produced in the apparatus according to this invention may be used in the production of building elements such as porous clinkers or tiles. The sintered granulate may however also be formed into a binder similar to slag cement or a mixed binder. In the last mentioned case I prefer to separate the grains up to 3 mm. from the granulate and to mix them with Portland cement or lime for the production of a mixed binder.

The grain fractions of 3–15 mm. remaining in the sieve before the sintered cake is broken up are preferably returned to the feed end of the kiln to be distributed on the grate.

When clay, slate clay and silica containing material are burned in a mix containing the low-grade fuel, so-called pozzuolana cement is obtained which can be ground and form a mixed binder.

When producing cement from the usual raw materials, the apparatus according to this invention offers the advantage of rendering any previous calcination before the treatment in the tunnel kiln unnecessary.

In the drawings affixed to this specification and forming part thereof two embodiments of the means for operating this invention are illustrated diagrammatically by way of example.

In the drawings:

Fig. 1 is a longitudinal section of a stationary tunnel kiln and the part connected to it for the production of a granulated product by sintering, the showing being highly schematic.

Fig. 2 is a plan view of this plant.

Fig. 3 is a longitudinal section of a plant adapted for transport and quite particularly suitable for the production of cement or the like or for the burning of lime or gypsum, with the front walls being removed in order to show clearly the inner parts, the middle section represented in Figs. 1 and 2 being here dispensed with.

Fig. 4 is a rear view of the combination shown in Fig. 3 as viewed from the rear at which the materials produced escape from the furnace.

Referring to the drawings and more especially to Figs. 1 and 2, 1 is a tunnel kiln built up from refractory brickwork or lined with such brickwork. In the interior 2 of the kiln extends a traveling grate 3 supported by rolls 4 and 5 which is cooled by water, being driven by an electromotor 10 driving the shaft 6 of the roll 4. 7 and 8 are hoppers extending into the kiln, the hopper 7 serving for the feed of the raw material to be treated, while the hopper 8 feeds the layer covering the grate which consists of the finely comminuted part, previously sintered and measuring 3–15 millimeters, of the heat-treated material which is first deposited in a layer 3–5 centimeters high to the grate surface, before the raw material is introduced.

Near the feed hoppers there is arranged in the furnace an igniting furnace 9 provided with an igniting nozzle 11 which heats the raw material introduced into the kiln to the ignition temperature of the combustible substances admixed to it.

Below the upper strand of the traveling grate 3 is arranged a suction pan 12 communicating by means of pipes 13, 14 with a dust separator compartment 15 located at the entrance end of the kiln which is connected by means of a conduit 16 with a suction blower 17 arranged next to the chimney 18. The suction port 13 nearest to the feed end of the kiln precedes the ignition nozzle 11 in the direction of flow of the charge. It therefore sucks towards this nozzle the residual air which is heated to a high temperature while passing through between the grate 3 and the roof 1. In consequence of this the bituminous constituents of the low-grade fuel in the charge will be burned in the kiln and thereby prevented from remaining in the waste gases as distillation products and being precipitated in the suction system or the blower itself. The blower 17 driven by the electromotor 19 sucks the air of combustion through the opening at the outlet of the tunnel kiln counter to the direction of travel of the grate 3 over the top surface of the grate and across the grate and the layer covering it downwardly into the pipes 13, 14 and the dust separator 15 and the conduit 16 into the chimney 18.

Above the end of the traveling grate near the outlet end of the kiln a spiked roll 21 driven by means of a chain 20 from the shaft 6 is rotated in a direction counter to that of the roll 4. The roll 21 crushes the sintered cake and conveys it to the sieve drum 22 formed with differently perforated walls. In its front section the fine-grainted portion measuring 1–3 mm. is entered into a chamber 23, to be returned by a conveying belt 24 to the station where the raw material is prepared for heat treatment, to be used in the regulation of the moisture content of the material. It may, however, also be used for other purposes, for instance for the production of a mixed binder. In the rear section of the sieve drum the grains measuring 3–15 mm. are transferred into a chamber 25 and returned from there by means of a conveying belt 26 to the hopper 8 to be used for the preparation of the layer covering the grate. The larger particles are evacuated near the end of the sieve drum to a ball mill or crusher or the like. The means (not shown) for driving the drum 22 may be driven by the shaft 6 and the motor 10.

In the portable apparatus shown in Figs. 3 and 4 which may for instance be used in the production of cement, the tunnel kiln consists of a sheet metal or profilated steel shell 31 combined with a brick lining, in which a traveling grate 32 is driven by a motor 28. The bottom part 33 of the tunnel is enclosed in perforated walls to provide for the cooling of the grate by means of the fresh air and for the sucking off of the kiln gases.

Similarly as in the apparatus shown in Figs. 1 and 2, the protective layer and the material to be treated are supplied to the furnace through a hopper 34 and spread by rolls 29 driven by means of a chain drive from the motor 28.

The fuel mixed with the mineral raw material is ignited by means of an oil or gas flame or by an electrical ignition device at 35 and 38.

The air of combustion is led into the tunnel 37 and towards the ignition point 38 from the discharge end 36 in counter-current to the direction of travel of the traveling grate and is sucked downwardly at 39 across the material under treatment. On its way the air cools the discharged material treated and in turn is preheated there and in contact with the walls of the kiln, so that high temperatures are obtained shortly after the fuel has been ignited. Part of the highly heated air is led to the point where the fuel is ignited and the bituminous constituents of the low-grade fuel are burned before being able to reach the suction system and be precipitated in the blower. In consequence of this method of preheating the kiln may be comparatively short.

As the end where the material is filled into the kiln a dust separator 40 with heat exchanger and suction blower 41 is arranged also similar to what has been shown in Figs. 1 and 2.

The apparatus as a whole is mounted on a low-charging chassis 42 and can be moved along, for instance by means of a tractor. The chassis may also be connected with the kiln for easy separation and may also be designed as a self-propelling unit having its own motor drive and steering means.

In the examples described herebelow, the process according to this invention is described in detail.

EXAMPLE I

*Production of a granulated product from clay and low grade brown coal*

In order to produce a cubic meter of a ceramic granulated material having a specific weight of 0.5, 400 kg. of waste clay are mixed with 80 kg. brown coal of 1800–2000 heat units and 2 kg. igniting oil.

The clay and brown coal are comminuted and intimately mixed in moist condition in a crushing roller mill and/or an edge runner, whereupon the mixture is supplied to a granulating drum. On the traveling grate is first deposited a protective layer of granulated material having a particle size of 3–15 mm. and recycled, i. e.

taken from the final products of the process remained below the sieve. On this protective layer are then deposited the granulated materials from the granulating drum, the total layer thereafter being 20-30 cm. high. The fuel admixed to the clay is ignited by the igniting flame and burned on the traveling grate by suction. The burning operation lasts at a temperature of 1000-1100° C. about 5 minutes. After having been discharged from the kiln the sintered material is first crushed by means of a spiked roll then sieved and the large fragments comminuted further in a pumice crusher. A sieving device is used to separate the desired fractions from each other.

EXAMPLE II

*Manufacture of building elements from the treated material* a. ACCORDING TO THE SAND LIMESTONE BRICK PROCESS

In order to work according to this process, the granulated material obtained as in Example I must be mixed with the required quantity of soluble silicid acid.

For instance 200 kg. of slacked lime are mixed with 500 kg. of granulated material having a specific weight of 0.5 and with 100 kg. ground sand. This mixture is formed or molded in a known manner and the molded articles placed in the hardening kettle. After having been treated at about 180° C. with steam at 8 atmospheres during 7-8 hours, the shaped bricks are sufficiently hardened to allow of withdrawing them. The steam is furnished by the waste heat device connected with the sintering tunnel kiln having been used for the production of the granulated material.

b. CERAMIC MOLDING

The ceramic molding is particularly advantageous regarding the quality and constant volume of the final product.

500 kg. of the granulated material having a specific weight of 0.5 are mixed with 200 kg. of binding clay containing not more than 15 percent water in weight. The materials are intimately mixed and, if necessary, the binding clay is previously treated with some caustic soda for the formation of a colloidal structure. After molding or forming by usual forming machines the desired shapes the shaped bodies are placed on the burning kiln and introduced to the kiln without previous drying and treated as in Example I. The burning temperature is about 900-1000° C. The strength of the molded products can be controlled during the burning operation.

EXAMPLE III

*Production of a mixed binder (slag cement)*

To this end the granulate is burned as in Example I up to sintering, the raw material however being so chosen that it contains by weight 42.7 percent CaO
36.7 percent $SiO_2$
19.4 percent $Al_2O_3$
0.3 percent FeO, and
0.7 percent MgO To 70 percent by weight of the granulated material obtained as in Example I are added 30 percent of hydrated burned lime and the mixture is ground in a tube mill. After treatment on a sieve having 4900 meshes per cm.² not more than 10 percent should remain over above the sieve. In order to promote the binding proper, 1 percent by weight of crude gypsum is added during the grinding.

EXAMPLE IV

*Production of Portland cement*

Limestone, clay and quartz sand are combined and ground in a tubular mill in about the following proportions:

| | Percent |
|---|---|
| CaO | 63 |
| $SiO_2$ | 22 |
| $Al_2O_3$ | 8 |
| $Fe_2O_3$ | 3 |
| MgO | 1 |

This material is mixed with 20 percent coke or poor mineral coal and granulated in a drum. The traveling grate is covered with a protective layer about 3-5 cm. high and recycled, i. e. taken from the final products obtained as in Example I below the sieve. The material to be treated is deposited thereon. The burning proceeds as described above in Example I at a temperature of 1450° C. during about 7-10 minutes. The cake is cooled down by air and crushed by a spiked roll. Those particles which have not been thoroughly burned are separated by sieving together with the protective layer material and returned (recycled) into the kiln. The cement clinker is ground together with about 3 percent of crude gypsum in a tubular mill. The material left on a sieve of 4900 meshes per square centimeter should not amount to more than 10 percent by weight.

Various changes may be made in the materials treated and the steps taken in the treatment without departing from the invention or sacrificing the advantages thereof.

I claim:

1. A plant for the production of a sintered granular material, particularly cement, with the use of low grade fuel in the raw material to be burned, comprising in combination, a tunnel kiln including a roof and side walls of refractory material having an opening at the discharge end the plane of which is transverse to the longitudinal axis of the tunnel kiln, said tunnel kiln being substantially closed at the end opposite the discharge end, a feed end in said kiln, ignition means arranged between said feed and discharge ends in close proximity to said feed end, a grate spaced a material distance from the roof of the kiln to provide a free space between the upper surface of the grate and the roof of the kiln, said grate being movable longitudinally in said kiln for conveying the combustion material from said feed end to said discharge end, and means for guiding the combustion air from its introduction at said discharge end, said means including the roof and side walls of said tunnel kiln arranged in close proximity to said grate whereby to guide said air close to said combustion material, in countercurrent to the direction of travel of said grate, and under heat insulating conditions, and suction means extending below the surface of said grate substantially from said discharge end to at least the region of said ignition means, whereby to heat the combustion air along its path and to provide by suction even near said ignition means, for the presence of highly heated air to insure complete combustion of even low grade fuel.

2. The plant of claim 1 comprising in addition a crushing roll for the sintered material disposed above the end of the grate at the discharge end of the kiln and serving to direct incoming combustion air through the sintered material on the grate.

References Cited in the file of this patent
UNITED STATES PATENTS

| 1,283,483 | Dwight et al. | Nov. 6, 1918 |
| 1,366,479 | Newberry | Jan. 25, 1921 |
| 1,688,422 | Hyde | Oct. 23, 1928 |
| 2,006,368 | Reid | July 2, 1935 |
| 2,052,329 | Wendeborn | Aug. 25, 1936 |
| 2,090,363 | Wendeborn | Aug. 17, 1937 |
| 2,157,321 | Bussmeyer | May 9, 1939 |
| 2,174,066 | Ahlmann | Sept. 26, 1939 |
| 2,214,345 | Pike | Sept. 10, 1940 |
| 2,410,944 | Johnson | Nov. 12, 1946 |
| 2,492,792 | Ford | Dec. 27, 1949 |
| 2,493,421 | Rolfsen | Jan. 3, 1950 |
| 2,505,249 | Johnson et al. | Apr. 25, 1950 |
| 2,652,242 | Sapp | Sept. 15, 1953 |